US011745465B2

(12) United States Patent
Vairo et al.

(10) Patent No.: US 11,745,465 B2
(45) Date of Patent: Sep. 5, 2023

(54) POLYURETHANE-BASED INSULATION BOARD

(71) Applicant: Dow Global Technologies LLC, Midland, MI (US)

(72) Inventors: Giuseppe Vairo, Correggio (IT); Elena Ferrari, Correggio (IT); Luigi Bertucelli, Correggio (IT); Alberto Fangareggi, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 444 days.

(21) Appl. No.: 16/767,263

(22) PCT Filed: Nov. 7, 2018

(86) PCT No.: PCT/US2018/059525
§ 371 (c)(1),
(2) Date: May 27, 2020

(87) PCT Pub. No.: WO2019/108350
PCT Pub. Date: Jun. 6, 2019

(65) Prior Publication Data
US 2020/0353716 A1 Nov. 12, 2020

(30) Foreign Application Priority Data
Nov. 28, 2017 (IT) .................. 102017000136482

(51) Int. Cl.
*B32B 5/18* (2006.01)
*B32B 5/20* (2006.01)
(Continued)

(52) U.S. Cl.
CPC ............. *B32B 7/02* (2013.01); *B29C 44/24* (2013.01); *B29C 44/30* (2013.01); *B29C 44/321* (2016.11);
(Continued)

(58) Field of Classification Search
None
See application file for complete search history.

(56) References Cited

U.S. PATENT DOCUMENTS 2,323,936 A * 7/1943 Roberts ............... E04B 1/74
52/561
3,565,746 A * 2/1971 Stevens ............... E04C 2/205
428/305.5
(Continued)

FOREIGN PATENT DOCUMENTS

AU 666885 B2 * 2/1996 ............ B32B 5/02
BE 893737 A 11/1982
(Continued)

OTHER PUBLICATIONS

Machine Translation of FR-2722811-A1, Jan. 1996 (Year: 1996).*
(Continued)

*Primary Examiner* — Jeffrey A Vonch
(74) *Attorney, Agent, or Firm* — Dinsmore & Shohl LLP

(57) ABSTRACT

External thermal insulation composite systems described herein include a concrete or masonry wall and a multilayer thermal insulation board disposed on the concrete or masonry wall. The multilayer thermal insulation board includes at least one closed cell foam layer comprising polyurethane and polyisocyanurate having an open cell volume of less than 20% by volume according to ASTM D 6226 and at least one open cell foam layer comprising polyurethane and polyisocyanurate having an open cell volume of greater than 80% by volume according to ASTM D 6226.

20 Claims, 2 Drawing Sheets

(51) Int. Cl.

| | | |
|---|---|---|
| *B32B 5/22* | (2006.01) | |
| *B32B 5/24* | (2006.01) | |
| *B32B 5/28* | (2006.01) | |
| *B32B 5/32* | (2006.01) | |
| *B32B 7/02* | (2019.01) | |
| *B32B 7/12* | (2006.01) | |
| *E04B 1/76* | (2006.01) | |
| *E04B 1/80* | (2006.01) | |
| *B29C 44/24* | (2006.01) | |
| *B29C 44/30* | (2006.01) | |
| *B29C 44/32* | (2006.01) | |
| *B32B 5/02* | (2006.01) | |
| *B32B 9/00* | (2006.01) | |
| *B32B 7/022* | (2019.01) | |
| *B32B 7/027* | (2019.01) | |
| *B32B 27/06* | (2006.01) | |
| *B32B 27/40* | (2006.01) | |
| *B32B 3/26* | (2006.01) | |
| *B32B 3/06* | (2006.01) | |
| *B32B 27/12* | (2006.01) | |
| *B29K 105/04* | (2006.01) | |
| *B29C 44/46* | (2006.01) | |
| *B29K 75/00* | (2006.01) | |
| *C08G 71/02* | (2006.01) | |

(52) U.S. Cl.
CPC ............ *B29C 44/326* (2013.01); *B32B 3/26* (2013.01); *B32B 5/022* (2013.01); *B32B 5/18* (2013.01); *B32B 5/20* (2013.01); *B32B 5/22* (2013.01); *B32B 5/245* (2013.01); *B32B 5/32* (2013.01); *B32B 7/022* (2019.01); *B32B 7/027* (2019.01); *B32B 7/12* (2013.01); *B32B 9/002* (2013.01); *B32B 27/065* (2013.01); *B32B 27/40* (2013.01); *E04B 1/762* (2013.01); *E04B 1/7625* (2013.01); *E04B 1/80* (2013.01); *E04B 1/806* (2013.01); *B29C 44/46* (2013.01); *B29K 2075/00* (2013.01); *B29K 2105/045* (2013.01); *B29K 2105/046* (2013.01); *B29K 2713/005* (2013.01); *B29K 2713/02* (2013.01); *B29K 2995/0015* (2013.01); *B29K 2995/0017* (2013.01); *B29K 2995/0063* (2013.01); *B29K 2995/0096* (2013.01); *B32B 3/06* (2013.01); *B32B 5/028* (2013.01); *B32B 27/12* (2013.01); *B32B 2250/02* (2013.01); *B32B 2250/03* (2013.01); *B32B 2250/04* (2013.01); *B32B 2250/05* (2013.01); *B32B 2250/40* (2013.01); *B32B 2255/10* (2013.01); *B32B 2260/021* (2013.01); *B32B 2260/023* (2013.01); *B32B 2260/04* (2013.01); *B32B 2262/101* (2013.01); *B32B 2266/0278* (2013.01); *B32B 2266/06* (2013.01); *B32B 2266/08* (2013.01); *B32B 2305/022* (2013.01); *B32B 2305/38* (2013.01); *B32B 2307/302* (2013.01); *B32B 2307/304* (2013.01); *B32B 2307/536* (2013.01); *B32B 2307/72* (2013.01); *B32B 2375/00* (2013.01); *B32B 2419/00* (2013.01); *C08G 71/02* (2013.01); *C08G 2110/005* (2021.01); *C08G 2110/0016* (2021.01); *C08G 2110/0025* (2021.01); *C08G 2110/0058* (2021.01); *C08G 2110/0083* (2021.01); *C08G 2330/00* (2013.01); *E04B 2103/04* (2013.01); *Y10T 428/2495* (2015.01); *Y10T 428/24942* (2015.01); *Y10T 428/24967* (2015.01); *Y10T 428/24992* (2015.01); *Y10T 428/249976* (2015.04); *Y10T 428/249977* (2015.04); *Y10T 428/249986* (2015.04); *Y10T 442/649* (2015.04); *Y10T 442/651* (2015.04); *Y10T 442/652* (2015.04)

(56) References Cited

U.S. PATENT DOCUMENTS

| | | | | |
|---|---|---|---|---|
| 3,582,095 | A | * | 6/1971 | Bogaert ................. F16J 15/104 |
| | | | | 428/161 |
| 3,657,036 | A | * | 4/1972 | Mullenhoff ............. B29C 44/24 |
| | | | | 264/DIG. 13 |
| 3,677,874 | A | * | 7/1972 | Sterrett .................... E04D 3/352 |
| | | | | 428/920 |
| 3,694,385 | A | * | 9/1972 | Salyer et al. ............. C08J 9/14 |
| | | | | 521/137 |
| 3,991,252 | A | | 11/1976 | Kolakowski et al. |
| 4,042,746 | A | * | 8/1977 | Hofer ....................... B32B 3/30 |
| | | | | 428/218 |
| 4,130,614 | A | * | 12/1978 | Saidla .................. B29C 44/145 |
| | | | | 264/46.7 |
| 4,318,258 | A | * | 3/1982 | Heck ....................... E04F 13/04 |
| | | | | 52/453 |
| 4,414,265 | A | * | 11/1983 | Rosato .................... E04C 2/243 |
| | | | | 428/401 |
| 4,451,587 | A | * | 5/1984 | Keshi ................. C08G 18/5006 |
| | | | | 521/914 |
| 4,500,656 | A | | 2/1985 | Rasshofer et al. |
| 4,548,861 | A | * | 10/1985 | Barnes ....................... C08J 9/42 |
| | | | | 264/45.3 |
| 4,555,442 | A | | 11/1985 | Frentzel |
| 4,735,970 | A | | 4/1988 | Sommerfeld et al. |
| 4,869,037 | A | | 9/1989 | Murphy |
| 4,938,819 | A | * | 7/1990 | Ishii ........................ B29B 11/06 |
| | | | | 264/48 |
| 4,943,597 | A | * | 7/1990 | Grunbauer ........... C08G 18/546 |
| | | | | 521/174 |
| 4,977,018 | A | * | 12/1990 | Irrgeher ................. E04B 1/6812 |
| | | | | 277/944 |
| 5,285,607 | A | * | 2/1994 | Somerville ............. E04C 2/205 |
| | | | | 52/309.7 |
| 5,318,997 | A | * | 6/1994 | Okada .................. C08G 18/4816 |
| | | | | 521/174 |
| 5,420,169 | A | * | 5/1995 | Schumacher ........ C08G 18/409 |
| | | | | 521/173 |
| 5,473,847 | A | * | 12/1995 | Crookston .............. E04C 2/205 |
| | | | | 52/95 |
| 5,523,334 | A | * | 6/1996 | White, III .......... C08G 18/5021 |
| | | | | 521/131 |
| 5,589,243 | A | * | 12/1996 | Day ..................... B29C 44/5654 |
| | | | | 428/56 |
| 5,654,344 | A | * | 8/1997 | Falke ....................... C08J 11/22 |
| | | | | 521/49 |
| 5,784,845 | A | * | 7/1998 | Imeokparia ............ E04D 11/02 |
| | | | | 52/409 |
| 5,856,678 | A | * | 1/1999 | Smits ....................... C08J 9/143 |
| | | | | 521/132 |
| 5,882,776 | A | * | 3/1999 | Bambara ................. B65D 5/509 |
| | | | | 441/74 |
| 5,889,067 | A | * | 3/1999 | Jang ......................... C08J 9/148 |
| | | | | 521/131 |
| 5,998,494 | A | * | 12/1999 | Hamilton ........... C08G 18/1875 |
| | | | | 521/131 |
| 6,108,991 | A | * | 8/2000 | Hagan ..................... E04F 13/08 |
| | | | | 52/506.01 |
| 6,114,403 | A | * | 9/2000 | Mercando .......... C08G 18/4018 |
| | | | | 312/401 |
| 6,314,695 | B1 | * | 11/2001 | Belleau ................... E04F 21/08 |
| | | | | 427/403 |
| 6,316,514 | B1 | * | 11/2001 | Falke ................... C08G 18/4804 |
| | | | | 521/137 |
| 6,552,098 | B1 | * | 4/2003 | Bosch .................... C08K 5/521 |
| | | | | 521/170 |
| 6,743,483 | B2 | | 6/2004 | Rochefort et al. |
| 8,397,465 | B2 | | 3/2013 | Hansbro et al. |
| 8,426,017 | B2 | | 4/2013 | Paradis et al. |

(56) References Cited

U.S. PATENT DOCUMENTS

| | | | |
|---|---|---|---|
| 8,470,436 B1 | 6/2013 | Paradis et al. | |
| 8,479,467 B2 | 7/2013 | Johnson et al. | |
| 8,597,779 B2 | 12/2013 | Paradis et al. | |
| 8,617,699 B2 | 12/2013 | Paradis et al. | |
| 2001/0014387 A1 | 8/2001 | Giampaolo | |
| 2003/0041544 A1* | 3/2003 | Rusek, Jr. | E04C 2/246 52/481.1 |
| 2004/0014382 A1* | 1/2004 | MacAulay | E04C 2/296 442/16 |
| 2004/0014828 A1* | 1/2004 | Haider | C08G 18/10 521/155 |
| 2004/0162359 A1* | 8/2004 | Barber | C08G 18/4219 521/159 |
| 2004/0180978 A1 | 9/2004 | Dreier | |
| 2004/0200171 A1* | 10/2004 | Schilger | E04C 2/205 52/506.01 |
| 2004/0229030 A1* | 11/2004 | Owensby | C08J 9/36 428/319.3 |
| 2004/0242717 A1* | 12/2004 | Beatty | C08J 9/00 521/155 |
| 2005/0014857 A1* | 1/2005 | Heinemann | C08G 18/36 521/155 |
| 2005/0055973 A1* | 3/2005 | Hagen | B29C 44/18 52/741.1 |
| 2005/0144901 A1* | 7/2005 | Egan | E04F 13/04 52/782.1 |
| 2005/0188649 A1* | 9/2005 | Hagen, Jr. | E04C 2/386 52/745.05 |
| 2006/0014846 A1* | 1/2006 | Sparks | C08G 18/546 521/155 |
| 2006/0021823 A1* | 2/2006 | Kohara | G10K 11/168 181/290 |
| 2006/0027948 A1* | 2/2006 | Grass | E04C 2/296 442/373 |
| 2006/0096205 A1* | 5/2006 | Griffin | E04D 3/18 52/309.4 |
| 2006/0179749 A1* | 8/2006 | Brandt | B32B 27/40 52/309.7 |
| 2006/0258762 A1 | 11/2006 | Dobransky et al. | |
| 2006/0275561 A1* | 12/2006 | Agrawal | E04D 3/351 428/2 |
| 2007/0110976 A1* | 5/2007 | Pastore | E04B 1/80 428/292.1 |
| 2007/0234667 A1* | 10/2007 | Lubker, II | E04B 2/706 52/408 |
| 2008/0200574 A1* | 8/2008 | Janzen | C08G 18/4018 521/170 |
| 2008/0234402 A1 | 9/2008 | Lehmann et al. | |
| 2008/0269365 A1 | 10/2008 | Andrew et al. | |
| 2008/0307715 A1* | 12/2008 | Pufahl | B32B 5/32 52/58 |
| 2009/0011203 A1* | 1/2009 | Mock | B32B 3/30 428/213 |
| 2009/0124718 A1* | 5/2009 | Lekovic | C08G 18/5021 521/137 |
| 2010/0031603 A1 | 2/2010 | Letts et al. | |
| 2010/0087562 A1* | 4/2010 | Diloreto | B29C 44/3496 521/170 |
| 2011/0168217 A1* | 7/2011 | Neff | C08G 18/797 428/36.5 |
| 2011/0196055 A1* | 8/2011 | Kramer | C08G 18/5027 521/170 |
| 2011/0197530 A1* | 8/2011 | Bahnmiller | B32B 27/304 52/762 |
| 2011/0229693 A1* | 9/2011 | Maurer | B29C 44/5627 428/159 |
| 2011/0258762 A1 | 10/2011 | Schultz | |
| 2011/0284320 A1* | 11/2011 | Bongiovi | B32B 17/067 181/294 |
| 2011/0313072 A1 | 12/2011 | Maurer et al. | |
| 2012/0028563 A1* | 2/2012 | Sacks | F24F 11/0001 454/258 |
| 2012/0085063 A1* | 4/2012 | Pufahl | E06B 1/62 428/141 |
| 2012/0216476 A1* | 8/2012 | Naidoo | B32B 13/02 52/794.1 |
| 2012/0237759 A1* | 9/2012 | Ehbing | B32B 5/08 156/60 |
| 2012/0251727 A1* | 10/2012 | Shimizu | C08G 18/6674 427/373 |
| 2012/0317914 A1 | 12/2012 | Bomberg et al. | |
| 2013/0104480 A1* | 5/2013 | Smith | E04B 2/847 52/309.7 |
| 2013/0164524 A1* | 6/2013 | Letts | B32B 27/40 428/319.3 |
| 2013/0209778 A1* | 8/2013 | Albach | C08G 18/06 521/174 |
| 2013/0227902 A1* | 9/2013 | Van Sloun | B32B 5/18 264/261 |
| 2013/0318911 A1* | 12/2013 | Sealock | E04C 2/243 428/71 |
| 2014/0115989 A1* | 5/2014 | Sievers | E04B 2/02 52/302.1 |
| 2014/0115991 A1* | 5/2014 | Sievers | E04C 2/386 52/309.4 |
| 2014/0151593 A1* | 6/2014 | Yin | B29C 44/28 427/373 |
| 2014/0275305 A1* | 9/2014 | Svenson | C08G 18/36 521/170 |
| 2014/0308492 A1* | 10/2014 | Albach | C08G 18/4804 252/62 |
| 2015/0038610 A1* | 2/2015 | Peters | C08J 9/08 521/175 |
| 2015/0093535 A1* | 4/2015 | Lambach | B29C 44/12 52/745.1 |
| 2015/0101276 A1* | 4/2015 | Lohmann | E04B 1/7675 52/745.1 |
| 2015/0111001 A1 | 4/2015 | Sagnard et al. | |
| 2015/0210035 A1* | 7/2015 | Rippel | B32B 5/026 428/218 |
| 2016/0046758 A1* | 2/2016 | Boehnke | C08G 18/4837 521/176 |
| 2016/0090460 A1* | 3/2016 | Singh | C08G 18/3206 521/131 |
| 2016/0194866 A1* | 7/2016 | Jones | G10K 11/162 264/48 |
| 2016/0272774 A1* | 9/2016 | Snider | E04C 2/296 |
| 2016/0361892 A1* | 12/2016 | Ciuperca | E04B 1/762 |
| 2017/0209897 A1* | 7/2017 | Clamor | B32B 5/32 |
| 2017/0241131 A1* | 8/2017 | Lewis | B05D 1/02 |
| 2017/0313806 A1 | 11/2017 | Yu et al. | |
| 2017/0326849 A1 | 11/2017 | White et al. | |
| 2017/0368785 A1* | 12/2017 | Fox | B32B 3/10 |
| 2018/0112394 A1* | 4/2018 | Giles | E04B 2/562 |
| 2018/0245335 A1* | 8/2018 | Schlüter | B32B 5/024 |
| 2018/0320370 A1* | 11/2018 | Letts | E04D 13/16 |
| 2018/0363298 A1* | 12/2018 | Giles | B29C 44/3403 |
| 2019/0048163 A1* | 2/2019 | McAdams | C08G 18/4837 |
| 2019/0127542 A1* | 5/2019 | El-Khatib | C08J 9/0042 |
| 2019/0194379 A1* | 6/2019 | Bindschedler | C08G 63/668 |
| 2019/0383031 A1* | 12/2019 | Baert | E04F 15/107 |
| 2020/0013384 A1* | 1/2020 | Hasegawa | B29C 39/02 |
| 2020/0298531 A1* | 9/2020 | Bertucelli | B32B 5/32 |
| 2020/0362553 A1* | 11/2020 | Vairo | E04B 1/7625 |
| 2020/0368996 A1* | 11/2020 | Katsura | B32B 3/30 |
| 2021/0115184 A1* | 4/2021 | Diloreto | C08G 18/163 |

FOREIGN PATENT DOCUMENTS

| | | | |
|---|---|---|---|
| CN | 1126138 A | | 7/1996 |
| CN | 1281401 A | | 1/2001 |
| CN | 1417437 A | * | 5/2003 |
| CN | 1455791 A | | 11/2003 |
| CN | 2606140 Y | | 3/2004 |
| CN | 1532037 A | | 9/2004 |
| CN | 1737285 A | * | 2/2006 |
| CN | 1775521 A | * | 5/2006 |
| CN | 1827978 A | * | 9/2006 |
| CN | 101109212 A | * | 1/2008 |

(56) References Cited

FOREIGN PATENT DOCUMENTS

| | | | | |
|---|---|---|---|---|
| CN | 101275410 | A | 10/2008 | |
| CN | 101618611 | A | 1/2010 | |
| CN | 101967861 | A * | 2/2011 | |
| CN | 102108769 | A | 6/2011 | |
| CN | 201891191 | U | 7/2011 | |
| CN | 102251638 | A | 11/2011 | |
| CN | 106032686 | A | 10/2016 | |
| CN | 106084749 | A | 11/2016 | |
| CN | 205804651 | U * | 12/2016 | |
| CN | 107163209 | A | 9/2017 | |
| DE | 2915474 | A * | 11/1980 | B29C 44/1209 |
| DE | 4321877 | C1 * | 9/1994 | E04B 1/762 |
| DE | 102010000600 | A1 * | 10/2010 | B32B 5/02 |
| EA | 025741 | B1 | 1/2017 | |
| EP | 0013731 | A1 | 8/1980 | |
| EP | 159454 | A * | 10/1985 | E04B 1/7612 |
| EP | 952266 | A2 * | 10/1999 | E04B 1/7612 |
| EP | 1201838 | A1 * | 5/2002 | B29C 44/30 |
| EP | 03012224 | A1 | 2/2003 | |
| EP | 1516720 | A1 | 3/2005 | |
| EP | 1621696 | A2 * | 2/2006 | E02D 31/02 |
| EP | 2186958 | A2 * | 5/2010 | E04B 1/762 |
| EP | 2644374 | A1 | 10/2013 | |
| EP | 2905117 | A1 * | 8/2015 | B29C 44/326 |
| FR | 2514387 | A * | 4/1983 | E04B 1/762 |
| FR | 2722811 | A1 * | 1/1996 | B32B 5/32 |
| JP | 59142137 | A * | 8/1984 | E04B 1/762 |
| JP | H02277623 | A | 11/1990 | |
| JP | 09096021 | A * | 4/1997 | |
| JP | 10244609 | A * | 9/1998 | B32B 5/32 |
| JP | 2000026567 | A * | 1/2000 | |
| JP | 2000052466 | A | 2/2000 | |
| JP | 2001232709 | A * | 8/2001 | |
| JP | 2001247647 | A | 9/2001 | |
| JP | 2002370300 | A * | 12/2002 | |
| JP | 2004092312 | A * | 3/2004 | E04B 1/7612 |
| JP | 2008308981 | A * | 12/2008 | |
| JP | 2015525316 | A | 9/2015 | |
| KR | 2006026780 | A * | 3/2006 | E04F 15/02452 |
| KR | 926834 | B1 * | 11/2009 | |
| NL | 8300524 | A * | 9/1984 | E04B 1/762 |
| NL | 1010514 | C2 * | 5/2000 | E04B 1/762 |
| RU | 2441119 | C2 | 8/2009 | |
| RU | 150450 | U1 | 2/2015 | |
| RU | 2645558 | C2 | 2/2018 | |
| SU | 1183642 | A * | 10/1985 | E04B 1/762 |
| WO | WO-9636655 | A1 * | 11/1996 | C08G 18/3206 |
| WO | WO-9960045 | A1 * | 11/1999 | C08G 18/4072 |
| WO | 2002022702 | A1 | 3/2002 | |
| WO | 03012224 | A1 | 2/2003 | |
| WO | WO-2007095961 | A1 * | 8/2007 | E04B 1/762 |
| WO | WO-2008145372 | A1 * | 12/2008 | B32B 27/08 |
| WO | 2013053566 | A1 | 4/2013 | |
| WO | 2013098859 | A1 | 7/2013 | |
| WO | 2014158512 | A1 | 10/2014 | |
| WO | 2015091801 | A1 | 6/2015 | |
| WO | 2015161024 | A1 | 10/2015 | |
| WO | WO-2015165870 | A1 * | 11/2015 | B32B 15/046 |
| WO | WO-2016178866 | A1 * | 11/2016 | |

OTHER PUBLICATIONS

Machine Translation of JP-10244609-A, Sep. 1998 (Year: 1998).*
Machine Translation of KR-926834-B1, Nov. 2009 (Year: 2009).*
Machine Translation of DE-102010000600-A1, Oct. 2010 (Year: 2010).*
Machine Translation of EP-2905117-A1, Aug. 2015 (Year: 2015).*
European Office Action dated Oct. 26, 2021, pertaining to European Patent Application No. 18759536.8, 10 pgs.
Russian Office Action dated Dec. 16, 2021, pertaining to Russian Patent Application No. 2020119817, 8 pgs.
Indian Office Action dated Dec. 31, 2021, pertaining to Indian Patent Application No. 202017023541, 5 pgs.
Chinese Office Action dated Jan. 18, 2022, pertaining to Chinese Patent Application No. 201880080823.6, 12 pgs.
Notice of Reasons for Refusal dated Oct. 18, 2022, pertaining to JP Patent Application No. 2020-528204, 8 pgs.
Search Report dated Oct. 19, 2022, pertaining to JP Patent Application No. 2020-528204, 21 pgs.
Japanese Office Action dated Aug. 23, 2022, pertaining to JP Patent No. 2020-528303, 4 total pages (English translation of the Office Action).
International Search Report and Written Opinion pertaining to PCT/US2018/059522, dated Jan. 16, 2019.
Italian Search Report and Written Opinion pertaining to Italian Patent Application No. 102017000136462, dated Jun. 5, 2018.
International Search Report and Written Opinion pertaining to PCT/US2018/047840, dated Nov. 26, 2018.
Italian Search Report and Written Opinion pertaining to Italian Patent Application No. 102017000136495, dated Jun. 5, 2018.
Article 94(3) dated Feb. 25, 2022, pertaining to EP Patent Application No. 18882743.0, 7 pgs.
Article 94(3) dated Oct. 21, 2021, pertaining to EP Patent Application No. 18883528.4, 4 pgs.
Examination Report dated Nov. 11, 2021, pertaining to IN Patent Application No. 202017023543, 10 pgs.
English Translation of Office Action dated Jan. 14, 2022, pertaining to CN Patent Application No. 201880082855.X, 5 pgs.
Office Action dated Mar. 1, 2022, pertaining to RU Patent Application No. 2020120512, 10 pgs.
Examination Report dated Mar. 25, 2022, pertaining to IN Patent Application No. 202017023542, 7 pgs.
Office Action dated Mar. 10, 2022, pertaining to RU Patent Application No. 2020120216, 11 pgs.
Office Action dated Apr. 24, 2022, pertaining to CN Patent Application No. 201880081542.2, 15 pgs.
International Search Report and Written Opinion pertaining to PCT/US2018/059525, dated Jan. 22, 2019.
Italian Search Report and Written Opinion pertaining to Italian Patent Application No. 102017000136482, dated May 18, 2018.

* cited by examiner

POLYURETHANE-BASED INSULATION BOARD

FIELD

Embodiments of the present disclosure are generally related to polyurethane-based insulation boards, and are more specifically related to polyurethane-based insulation boards including an open cell polyurethane/polyisocyanurate foam layer and a closed cell polyurethane/polyisocyanurate foam layer.

BACKGROUND

Insulation systems for external walls, such as concrete or masonry walls, have been proposed. The combination of the thermal insulation product applied on the outer face of the external wall and faced by a rendering system is referred to as an external thermal insulation composite system (ETICS). External thermal insulation composite systems are often the preferred choice in construction over other solutions, both for new dwellings and for refurbishment of existing building stock.

Most common external thermal insulation composite systems employ expanded polystyrene (EPS) as in insulating material. Polyurethane may typically provide certain favorable properties over lower cost alternatives, such as thermal insulation, strength, and limited water uptake. Additionally, closed cell polyurethane foam may provide improved insulation over EPS. However, such closed cell polyurethane foams may exhibit diminished dimensional stability as compared to EPS. Accordingly, it is proposed to combine open cell and closed cell polyurethane based insulation boards with external walls in external thermal insulation composite systems.

SUMMARY

According to one or more embodiments herein, an external thermal insulation composite system includes a concrete or masonry wall and a multilayer thermal insulation board disposed on the concrete or masonry wall. The multilayer thermal insulation board includes at least one closed cell foam layer comprising polyurethane and polyisocyanurate having an open cell volume of less than 20% by volume according to ASTM D 6226 and at least one open cell foam layer comprising polyurethane and polyisocyanurate having an open cell volume of greater than 80% by volume according to ASTM D 6226. The closed cell layer may provide insulation properties while the open cell layer of the multilayer thermal insulation board may help mitigate the effect of dimensional changes of the closed cell layer.

DETAILED DESCRIPTION

Figure 1:
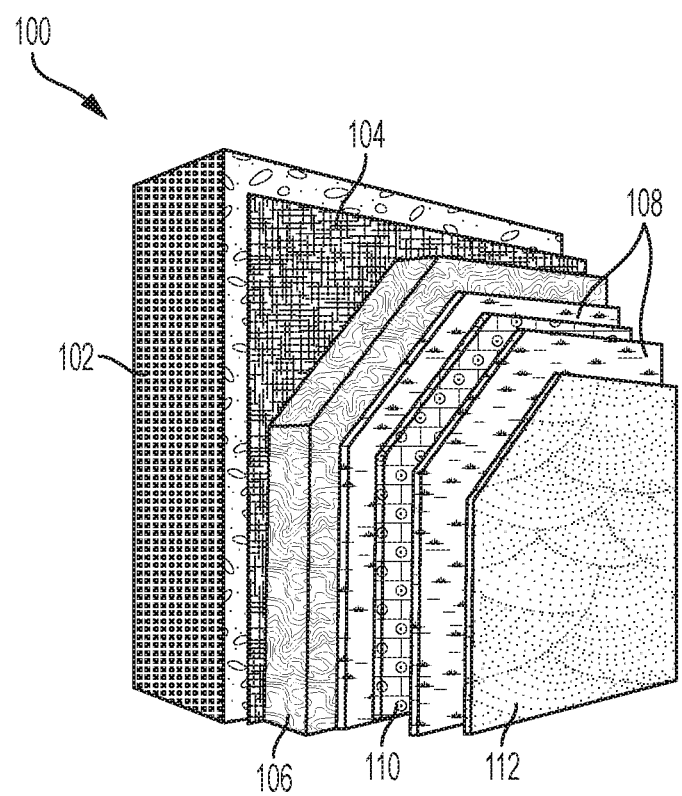
FIG. 1 illustrates an exemplary external thermal insulation composite system.

Referring to FIG. 1, an external thermal insulation composite system 100 may include an external wall 102, such as a concrete or masonry wall. Masonry, also known as stonework or brickwork, may include relatively large units (stone, bricks, blocks, etc.) that are bound together by mortar into a monolithic structure. Concrete is made of cement, aggregates and water and may be set into place to create a structure without units.

The system may further include an adhesive 104 disposed directly on an outer surface of the external wall 102. The adhesive 104 may be placed between the outer surface of the external wall 102 and an insulation component 106. In various embodiments, the adhesive 104 may be a flexible adhesive, such as a foam adhesive, silicone adhesive, hot melt adhesive, or cold melt adhesives. In some particular embodiments, the adhesive may be a polyurethane foam adhesive, such as the polyurethane foam adhesive commercially available as Insta-Stik™ from The Dow Chemical Company (Midland, Mich.). Although various embodiments described herein describe an adhesive 102 for attaching the insulation component 106 to the external wall 102, it is contemplated that the insulation component 106 may be attached to the external wall 102 in other ways, such as through the use of a mechanical fixing device.

According to various embodiments, the insulation component 106 may be a multilayer thermal insulation board that includes a closed cell polyurethane/polyisocyanurate foam layer 202 having an open cell volume of less than 20% by volume according to ASTM D 6226 and an open cell polyurethane/polyisocyanurate foam layer 204 having an open cell volume of greater than 80% by volume according to ASTM D 6226 (shown in FIGS. 2 and 3), as will be described in greater detail below. As used herein, an "open cell" of the polyurethane/polyisocyanurate foam is defined as a cell which is not completely closed and directly or indirectly interconnecting with other cells. As used herein, a "closed cell" is defined as a cell which is completely closed and non-connecting with any other cells.

Still referring to FIG. 1, the external thermal insulation composite system 100 may further include one or more base coat layers 108 separated from the adhesive 104 by the insulation component 106. Although the embodiment depicted in FIG. 1 includes two base coat layers 108, it is contemplated that in some embodiments, the external thermal insulation composite system 100 may include three or more base coat layers, one base coat layer, or even no base coat layers.

The external thermal insulation composite system 100 depicted in FIG. 1 also includes a reinforcing mesh 110 positioned between the two base coat layers 108. In various embodiments, the reinforcing mesh 110 may be a polymer coated glass-fiber mesh fabric. The glass-fiber mesh fabric may, in some particular embodiments, have a weight of 100 to 220 g/m, or a weight of 140 to 180 g/m.

Finally, a top coat 112 is positioned on the external thermal insulation composite system 100. The top coat may include, by way of example and not limitation, grained and scratched renders, decorative panels, brick effects, or actual brick slips. Other types of top coats are contemplated, depending on the particular embodiment.

Having generally described the external thermal insulation composite system 100, the insulation component 106 will now be described in greater detail, with reference to FIGS. 2 and 3. As provided above, in various embodiments, the insulation component 106 is a multilayer thermal insulation board that includes a closed cell polyurethane/polyisocyanurate foam layer 202 having an open cell volume of less than 20% by volume according to ASTM D 6226 and an open cell polyurethane/polyisocyanurate foam layer 204 having an open cell volume of greater than 80% by volume according to ASTM D 6226. As used herein, the term "polyurethane" encompasses polyurethane, polyurethane/polyurea, and polyurethane/polyisocyanurate materials. As used herein, the term "polyurethane/polyisocyanurate foam layer" refers to foam layers comprising polyurethane and polyisocyanurate. In various embodiments, the insulation layer 106 may include at least one facing layer 206.

Closed Cell Polyurethane/Polyisocyanurate Foam Layer

In various embodiments, the closed cell polyurethane/polyisocyanurate foam layer may be formed from a polymer matrix formed by reacting an isocyanate-reactive component with an isocyanate component. In particular, the polymer matrix may include urethane groups, isocyanurate groups, and/or urea groups.

The isocyanate-reactive component includes one or more polyols. In some embodiments, the isocyanate-reactive mixture includes at least one polyester polyol. Various molecular weights are contemplated for the polyester polyol. The polyester polyol may contain multiple ester groups per molecule and have an average of at least 1.5 hydroxyl groups per molecule, at least 1.8 hydroxyl groups per molecule, or at least 2 hydroxyl groups per molecule. It may contain up to 6 hydroxyl groups per molecule in some embodiments, but, in other embodiments, will contain up to about 3 hydroxyl groups per molecule. The hydroxyl equivalent weight of the polyester polyol can range from about 75 to 4000 or from 150 to 1500.

Suitable polyester polyols include reaction products of hydroxylated compounds, for example diols, with polycarboxylic acids or their anhydrides, such as dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The hydroxylated compounds used in making the polyester polyols may have an equivalent weight of 150 or less, 140 or less, or 125 or less, and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerin, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol, polyethylene glycol, and the like.

Other types of polyols may be used in addition to those provided above. For example, aromatic or aliphatic polyether polyols, aliphatic or aromatic polyether-carbonate polyols, aliphatic or aromatic polyether-ester polyols, and polyols obtained from vegetable derivatives may be used. Accordingly, various combinations of polyols may be used to form the isocyanate-reactive component. For example, other example polyols include VORANOL™ RN490 and VORANOL™ RH360 (polyether polyols formed by adding propylene oxide to sucrose and glycerine and having an average functionality greater than 4 and an EW of 115 and 156, respectively), VORANOL™ RN482 (polyether polyol formed by adding propylene oxide to sorbitol and having a nominal functionality of 6 and an EW of 115), TERCAROL™ 5903 (polyether polyol formed by adding propylene oxide to toluenediamine and having a nominal functionality of 4 and an EW of 127), all available from The Dow Chemical Company (Midland, Mich.).

Other additives, such as chain extenders, cross-linkers, and the like may also be included. Example chain extenders include dipropylene glycol, tripropylene glycol, diethyleneglycol, polypropylene, and polyethylene glycol.

The isocyanate component may include isocyanate-containing reactants that are aliphatic, cycloaliphatic, alicyclic, arylaliphatic, and/or aromatic isocyanates and derivatives thereof. Derivatives may include, by way of example and not limitation, allophanate, biuret, and NCO-terminated prepolymers. According to some embodiments, the isocyanate component includes at least one aromatic isocyanate (e.g., at least one aromatic polyisocyanate). For example, the isocyanate component may include aromatic diisocyanates such as at least one isomer of toluene diisocyanate (TDI), crude TDI, at least one isomer of diphenyl methylene diisocyanate (MDI), crude MDI, and/or higher functional methylene polyphenol polyisocyanate. As used herein, MDI refers to polyisocyanates selected from diphenylmethane diisocyanate isomers, polyphenyl methylene polyisocyanates, and derivatives thereof bearing at least two isocyanate groups. The crude, polymeric, or pure MDI may be reacted with polyols or polyamines to yield modified MDI. Blends of polymeric and monomeric MDI may also be used. In some embodiments, the MDI has an average of from 2 to 3.5 (e.g., from 2 to 3.2) isocyanate groups per molecule. Example isocyanate-containing reactants include those commercially available under the tradename VORANATE™ from The Dow Chemical Company (Midland, Mich.), such as VORANATE™ M229 PMDI isocyanate (a polymeric methylene diphenyl diisocyanate with an average of 2.7 isocyanate groups per molecule).

An isocyanate index for the closed cell polyurethane/polyisocyanurate foam layer may be greater than 180, greater than 195, and/or greater than 200. The isocyanate index may be less than 2,000. For example, in some embodiments, the isocyanate index may be from 180 to 1,500, from 185, to 1,000, from 190 to 750, from 195 to 500, or from 200 to 300. As used herein, "isocyanate index" is the number of equivalents of isocyanate-containing compound added per 100 theoretical equivalents of isocyanate-reactive compound. An isocyanate index of 100 corresponds to one isocyanate group per isocyanate-reactive hydrogen atom present, such as from water and the polyol composition. A higher isocyanate index indicates a higher amount of isocyanate-containing reactant.

A catalyst may also be included in the composition forming the closed cell polyurethane/polyisocyanurate foam layer. Example catalysts that may be used include trimerisation catalysts, which promote reaction of isocyanate with itself, such as tris(dialkylaminoalkyl)-s-hexahydrotriazines (such as 1,3,5-tris(N,N-dimethylaminopropyl)-s-hexahydrotriazine, DABCO™ TMR 30, DABCO™ K-2097 (potassium acetate), DABCO™ K15 (potassium octoate), POLYCAT™ 41, POLYCAT™ 43, POLYCAT™ 46, DABCO™ TMR, CURITHANE™ 52, tetraalkylammonium hydroxides (such as tetramethylammonium hydroxide), alkali metal hydroxides (such as sodium hydroxide), alkali metal alkoxides (such as sodium methoxide and potassium isopropoxide), and alkali metal salts of long-chain fatty acids having 10 to 20 carbon atoms (and in some embodiments, pendant hydroxyl groups).

The closed cell polyurethane/polyisocyanurate foam layer may also include one or more additives. For example, in some embodiments, the closed cell polyurethane/polyisocyanurate foam layer further includes at least one flame retardant. The flame retardant may be present in an amount from 1 wt % to 50 wt % (e.g., 1 wt % to 30 wt %, 1.5 wt % to 20 wt %, 1.5 wt % to 10 wt %, 1.5 wt % to 8 wt %, 2 wt % to 5 wt %, 2.5 wt % to 4 wt %, 2.5 wt % to 3.5 wt %, etc.), based on the total weight of the composition for forming the closed cell polyurethane/polyisocyanurate foam layer. The flame retardant may be a solid or a liquid, and include a non-halogenated flame retardants, a halogenated flame retardant, or combinations thereof. Example flame retardants include, by way of example and not limitation, melamine, expandable graphite, phosphorous compounds with or without halogens, aluminum containing compounds, magnesium based compounds, nitrogen based compounds with or without halogens, chlorinated compounds, brominated compounds, and boron derivatives.

In various embodiments, the closed cell polyurethane/polyisocyanurate foam layer may include a physical blowing agent. As used herein, "physical blowing agents" are low-boiling liquids which volatilize under the curing conditions to form the blowing gas. Exemplary physical blowing agents include hydrocarbons, fluorocarbons, hydrofluorocarbons, hydrofluoroolefins, hydrochlorofluoroolefins, and other halogenated compounds.

The closed cell polyurethane/polyisocyanurate foam layer may have a thickness from 10 mm to 300 mm. For example, the closed cell polyurethane/polyisocyanurate foam layer may have a thickness from 10 mm to 250 mm, from 10 mm to 200 mm, from 10 mm to 150 mm, from 10 mm to 100 mm, from 10 mm to 50 mm, from 10 mm to 25 mm, from 10 mm to 20 mm or the like. The closed cell polyurethane/polyisocyanurate foam layer may be rigid or semi-rigid, but in various embodiments, the closed cell polyurethane/polyisocyanurate foam layer is not brittle.

In various embodiments, the closed cell polyurethane/polyisocyanurate foam layer has a density of less than 100 kg/m$^3$, less than 75 kg/m$^3$, less than 50 kg/m$^3$ and/or less than 40 kg/m$^3$ as measured according to ASTM D 1622. The density may be greater than 10 kg/m$^3$, greater than 20 kg/m$^3$, and/or greater than 30 kg/m$^3$. For example, the density may be from 10 to 100 kg/m$^3$, from 20 to 75 kg/m$^3$, or from 25 to 50 kg/m$^3$.

The closed cell polyurethane/polyisocyanurate foam layer has an open cell volume of less than 20% by volume according to ASTM D 6226, an open cell volume of less than 10% by volume, and/or an open cell volume of less than 8% by volume. In some embodiments, the closed cell polyurethane/polyisocyanurate foam layer has an open cell volume of greater than 0% by volume according to ASTM D 6226, an open cell volume of greater than 0.1% by volume, an open cell volume of greater than 1% by volume, an open cell volume of greater than 2.5% by volume, an open cell volume of greater than 5% by volume and/or an open cell volume of greater than 6% by volume. For example, the closed cell polyurethane/polyisocyanurate foam layer may have an open cell volume of from 0% to 20%, from 0.1% to 10%, or even from about 5% to 8% by volume.

The closed cell polyurethane/polyisocyanurate foam layer may be formed by reacting the isocyanate-reactive component with the isocyanate-containing reactant to form a polymer matrix, along with any additives. In some particular embodiments, the closed cell polyurethane/polyisocyanurate foam layer is a polyurethane/polyisocyanurate foam layer having an isocyanate index of from 180 to 450, a polyester polyol, and a physical blowing agent, and is characterized by an open cell content of less than 20% by volume, and a density of less than 50 kg/m$^3$. In various embodiments, the closed cell foam layer has a thermal conductivity value (k-factor) of less than 26 mW/m*K measured at 10° C., less than 24 mW/m*K measured at 10° C., or even less than 20 mW/m*K measured at 10° C. As is understood by those skilled in the art, lambda or k-factor is a measure of the thermal conductivity of the foam layer, where a lower value indicates improved thermal insulation performance. The k-factor is the measure of heat that passes through one square foot of material that is one inch thick in an hour.

Open Cell Polyurethane/Polyisocyanurate Foam Layer

In various embodiments, the open cell polyurethane/polyisocyanurate foam layer may be formed from a polymer matrix formed by reacting an isocyanate-reactive component with an isocyanate component. In particular, the polymer matrix may include urethane groups, isocyanurate groups, and/or urea groups.

The isocyanate-reactive component includes one or more polyols. In some embodiments, the isocyanate-reactive mixture includes at least one polyether polyol. Various molecular weights are contemplated for the polyether polyol. The polyether polyol may be derived from one or more alkylene oxides such as propylene oxide, ethylene oxide, and/or butylene oxide, as would be understood by a person of ordinary skill in the art. For example, the polyether polyol may be prepared by reacting the one or more alkylene oxides with one or more initiators having from 2 to 10 active hydrogens, in the presence of a polymerization catalyst. Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cyclohexane diol, glycerine, trimethanol propane, triethanolamine, sucrose, sorbitol and toluenediamine.

The polyether polyol may have a number average molecular weight of from about 200 g/mol to about 15,000 g/mol. In some embodiments, the molecular weight is greater than about 400 g/mol or greater than about 1000 g/mol. In other embodiments, the molecular weight may be less than about 15000 g/mol, less than about 10,000 g/mol, or less than about 9,000 g/mol. Accordingly, in some embodiments, the polyether polyol has a molecular weight of from about 425 g/mol to about 8500 g/mol or from about 450 g/mol to about 4000 g/mol. Examples of suitable polyether polyols include, but are not limited to, those commercially available under the trademark VORAPEL™, those commercially available under the trademark VORANOL™, such as VORALUX™ HF505, VORANOL™ 8000 LM, VORANOL™ 4000 LM, VORANOL™ 1010 L, VORANOL™ CP 1055, and VORANOL™ CP 260, and those commercially available as Polyglycol P-2000 and Polyglycol P-425, all available from The Dow Chemical Company (Midland, Mich.).

For example, other example polyols include VORANOL™ RN490 and VORANOL™ RH360 (polyether polyols formed by adding propylene oxide to sucrose and glycerine and having an average functionality greater than 4 and an EW of 115 and 156, respectively), VORANOL™ RN482 (polyether polyol formed by adding propylene oxide to sorbitol and having a nominal functionality of 6 and an EW of 115), TERCAROL™ 5903 (polyether polyol formed by adding propylene oxide to toluenediamine and having a nominal functionality of 4 and an EW of 127), all available from The Dow Chemical Company (Midland, Mich.).

As used herein, a hydroxyl number is the milligrams of potassium hydroxide equivalent to the hydroxyl content in one gram of the polyol or other hydroxyl compound. In some embodiments, the resultant polyether polyol has a hydroxyl number of from about 10 mg KOH/g to about 700 mg KOH/g. In still other embodiments, the resultant polyether polyol has a hydroxyl number of from about 275 mg KOH/g to about 400 mg KOH/g. The polyether polyol may have a nominal hydroxyl functionality of from about 2 or greater (e.g., from 2 to 6, from 2 to 5, from 2 to 4, or 2). The polyether polyol may have an average overall hydroxyl functionality of from about 2 to about 4.5 (e.g., 2 to 3.5). As used herein, the hydroxyl functionality (nominal and average overall) is the number of isocyanate reactive sites on a molecule, and may be calculated as the total number of moles of OH over the total number of moles of polyol.

Other types of polyols may be used in addition to those provided above. For example, aliphatic polyester or aromatic polyester polyols, aliphatic or aromatic polyether-carbonate polyols, aliphatic or aromatic polyether-ester polyols, and polyols obtained from vegetable derivatives may be used. Accordingly, various combinations of polyols may be used to form the isocyanate-reactive component.

Other additives, such as chain extenders, flame retardants, cross-linkers, fillers, and the like may also be included. Example chain extenders include dipropylene glycol, tripropylene glycol, diethyleneglycol, polypropylene, and polyethylene glycol.

The flame retardant may be a solid or a liquid, and include a non-halogenated flame retardants, a halogenated flame retardant, or combinations thereof. Example flame retardants include, by way of example and not limitation, melamine, expandable graphite, phosphorous compounds with or without halogens, aluminum containing compounds, magnesium based compounds, nitrogen based compounds with or without halogens, chlorinated compounds, brominated compounds, and boron derivatives.

In certain embodiments the reaction mixture for forming the open-celled polyurethane layer may include a filler. Suitable fillers may be selected from the families of inorganic compounds such as calcium carbonate or of polymeric materials such as polyethylene, polyamide or polytetrafluoroethylene.

The isocyanate component may include isocyanate-containing reactants that are aliphatic, cycloaliphatic, alicyclic, arylaliphatic, and/or aromatic isocyanates and derivatives thereof. Derivatives may include, by way of example and not limitation, allophanate, biuret, and NCO-terminated prepolymers. According to some embodiments, the isocyanate component includes at least one aromatic isocyanate (e.g., at least one aromatic polyisocyanate). For example, the isocyanate component may include aromatic diisocyanates such as at least one isomer of toluene diisocyanate (TDI), crude TDI, at least one isomer of diphenyl methylene diisocyanate (MDI), crude MDI, and/or higher functional methylene polyphenol polyisocyanate. As used herein, MDI refers to polyisocyanates selected from diphenylmethane diisocyanate isomers, polyphenyl methylene polyisocyanates, and derivatives thereof bearing at least two isocyanate groups. The crude, polymeric, or pure MDI may be reacted with polyols or polyamines to yield modified MDI. Blends of polymeric and monomeric MDI may also be used. In some embodiments, the MDI has an average of from 2 to 3.5 (e.g., from 2 to 3.2) isocyanate groups per molecule. Example isocyanate-containing reactants include those commercially available under the tradename VORANATE™ from The Dow Chemical Company (Midland, Mich.), such as VORANATE™ M229 PMDI isocyanate (a polymeric methylene diphenyl diisocyanate with an average of 2.7 isocyanate groups per molecule).

An isocyanate index for the open cell polyurethane/polyisocyanurate foam layer may be greater than 70, greater than 100, greater than 180, greater than 195, and/or greater than 200. The isocyanate index may be less than 2,000. As used herein, "isocyanate index" is the number of equivalents of isocyanate-containing compound added per 100 theoretical equivalents of isocyanate-reactive compound. An isocyanate index of 100 corresponds to one isocyanate group per isocyanate-reactive hydrogen atom present, such as from water and the polyol composition. A higher isocyanate index indicates a higher amount of isocyanate-containing reactant.

A catalyst may also be included in the composition forming the open cell polyurethane/polyisocyanurate foam layer. Example catalysts are tertiary amines like POLYCAT™ 5 and POLYCAT™ 8. Additionally, the catalyst composition may include trimerisation catalysts, which promote reaction of isocyanate with itself, such as tris(dialkylaminoalkyl)-s-hexahydrotriazines (such as 1,3,5-tris(N,N-dimethylaminopropyl)-s-hexahydrotriazine, DABCO™ TMR 30, DABCO™ K-2097 (potassium acetate), DABCO™ K15 (potassium octoate), POLYCAT™ 41, POLYCAT™ 43, POLYCAT™ 46, DABCO™ TMR, CURITHANE™ 52, tetraalkylammonium hydroxides (such as tetramethylammonium hydroxide), alkali metal hydroxides (such as sodium hydroxide), alkali metal alkoxides (such as sodium methoxide and potassium isopropoxide), and alkali metal salts of long-chain fatty acids having 10 to 20 carbon atoms (and in some embodiments, pendant hydroxyl groups).

The open cell polyurethane/polyisocyanurate foam layer also includes one or more blowing agents. The blowing agent is present in an amount to provide the open cell polyurethane/polyisocyanurate foam layer with the desired overall density and open cell content. The blowing agent employed may include carbon dioxide added as a gas or a liquid, or advantageously generated in-situ by the reaction of water with polyisocyanate, optionally in combination with a physical co-blowing agent. Carbon dioxide may also be chemically obtained by other means including the amine/carbon dioxide complexes such as disclosed in U.S. Pat. Nos. 4,735,970 and 4,500,656, the full disclosures of which are hereby incorporated by reference in their entireties, for use as a blowing agent. Other suitable blowing agents include, for example, volatile alkanes such as pentane, hexane or halogen-containing substances such as fluorocarbons and the hydrogen-containing chlorofluorocarbon compounds. The physical blowing agent is not particularly limited. In some particular embodiments, the blowing agent consists essentially of water. Typically for this purpose, the amount of water present is from about 0.5 to about 15, preferably from about 2.0, more preferably from about 3.0, and preferably up to about 10, more preferably up to about 8 parts per 100 parts by weight of polyol. When a physical blowing agent is present, typically the amount is from about 0.5 to about 10, preferably from about 1 to about 5, parts per 100 parts by weight of polyol.

Additionally or alternatively, one or more surfactants may be used in preparing the open cell polyurethane/polyisocyanurate foam layer. For example, in various embodiments, the percentage of open cell versus closed cell in the polyurethane/polyisocyanurate foam may be controlled through the use of cell-opening surfactants. Examples of such cell-opening surfactants include, but are not limited to those sold by Maysta under the trade names AK-9903 and those sold by Momentive under the trade name NIAX™ Silicone L-6164.

The isocyanate-reactive component of the present disclosure can include 0.5 weight percent (wt. %) to 15 wt. % of surfactant, where the wt. % is based on a total weight of the isocyanate-reactive component. Combinations of more than one of each type of surfactant as discussed herein may also be selected, provided their combined percentages in the isocyanate-reactive component as a whole comply with the stated ranges.

The open cell polyurethane/polyisocyanurate foam layer may have a thickness from 5 mm to 80 mm. For example, the open cell polyurethane/polyisocyanurate foam layer may have a thickness from 5 mm to 50 mm, from 5 mm to 30 mm, from 5 mm to 25 mm, from 5 mm to 20 mm, from 5 mm to 15 mm, from 5 mm to 10 mm, or the like. The open cell polyurethane/polyisocyanurate foam layer may be rigid or semi-rigid, but in various embodiments, the open cell polyurethane/polyisocyanurate foam layer is not brittle.

In various embodiments, the open cell polyurethane/polyisocyanurate foam layer has a density of less than 200 kg/m$^3$, less than 100 kg/m$^3$, and/or less than 70 kg/m$^3$ as measured according to ASTM D 1622. The density may be greater than 10 kg/m$^3$, greater than 20 kg/m$^3$, and/or greater than 30 kg/m$^3$. For example, the density may be from 30 to 70 kg/m$^3$ or from 30 to 80 kg/m$^3$.

The open cell polyurethane/polyisocyanurate foam layer has an open cell volume of greater than 50% by volume according to ASTM D 6226, an open cell volume of greater than 60% by volume, an open cell volume of greater than 75% by volume, and/or an open cell volume of greater than 80% by volume. For example, the open cell polyurethane/polyisocyanurate foam layer may have an open cell volume of from 75% to 99%, or from 80% to 95% by volume.

The open cell polyurethane/polyisocyanurate foam layer may be formed by reacting the isocyanate-reactive component with the isocyanate-containing reactant to form a polymer matrix, along with any additives. In some particular embodiments, the open cell polyurethane/polyisocyanurate foam layer is a polyurethane foam layer having an open cell content of greater than 80% by volume, and a density of from 30 to 80 kg/m$^3$.

Facing Layer

As provided above, in some embodiments, the insulation layer 106 may further include at least one facing layer 206. In embodiments, the facing layer 206 may be positioned between the open cell polyurethane/polyisocyanurate foam layer 204 and the closed cell polyurethane/polyisocyanurate foam layer 202, or adjacent to just one of the open cell polyurethane/polyisocyanurate foam layer 204 and the closed cell polyurethane/polyisocyanurate foam layer 202. For example, as shown in FIG. 2, the facing layer 206a may be separated from the closed cell polyurethane/polyisocyanurate foam layer 202 by the open cell polyurethane/polyisocyanurate foam layer 204, the facing layer 206b may be positioned between the closed cell polyurethane/polyisocyanurate foam layer 202 and the open cell polyurethane/polyisocyanurate foam layer 204, and the facing layer 206c may be separated from the open cell polyurethane/polyisocyanurate foam layer 204 by the closed cell polyurethane/polyisocyanurate foam layer 202. It should be understood that the facing layer 206, when included in the insulation layer 106, can be positioned at any of the locations described in FIG. 2. For example, the insulation layer 106 may include facing layers 206a, 206b, and 206c, or the insulation layer 106 may include facing layers 206a and 206c, facing layers 206a and 206b, or facing layers 206b and 206c, or the insulation layer 106 may include only one of facing layers 206a, 206b, or 206c.

In various embodiments, the facing layer 206 is a non-metal based facing layer, such as a glass-fleece based material. As used herein, "glass-fleece based material" refers to a material that includes glass fleece, such as a glass-fleece substrate. The glass-fleece may be saturated glass-fleece or non-saturated glass-fleece. The non-metal based facings for the insulation component 106 may be selected from glass based material that includes glass fleece, polymer membrane based material, and composite multi-layer foil material.

Example materials suitable for use as facing layers include, for example composite foils including multiple ply laminates of polymers and/or papers, and glass-fleece or glass tissues that may be mineral or bituminous coated. The glass-fleece may be saturated or non-saturated. According to some embodiments, it may be desirable to remove one or more outermost facing layer before use. In some embodiments, the insulation component may have a peel-able facing layer. In such embodiments, the peel-able facing layer may be removed from the insulation component before the insulation component is used. Examples of peel-able facings include polyolefin films (such as, but not limited to, propylene and polyethylene), polyhalogenated polyolefins, waxed paper and waxed plastic films, plastic and composite foils.

Figure 2:
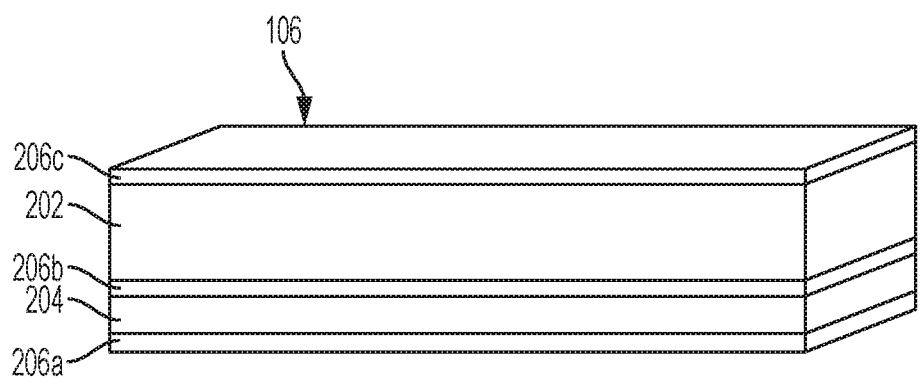
FIG. 2 shows an exemplary multilayer thermal insulation board including a closed cell polyurethane/polyisocyanurate foam layer, an open cell polyurethane/polyisocyanurate foam layer, and multiple facing layers.
Figure 3:
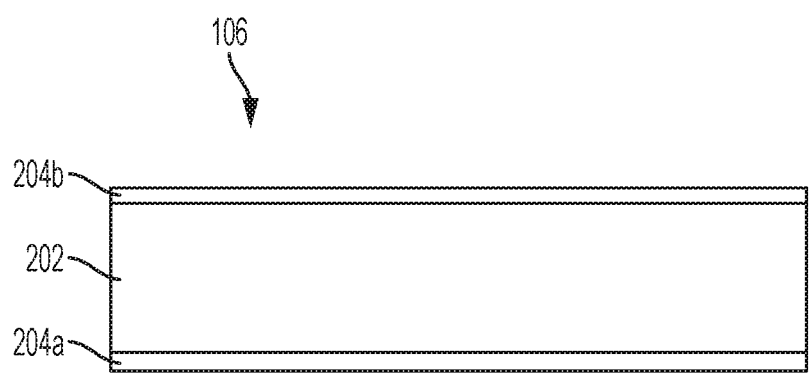
FIG. 3 shows an exemplary multilayer thermal insulation board including a closed cell polyurethane/polyisocyanurate foam layer disposed between two open cell polyurethane/polyisocyanurate foam layers.

In some embodiments, a second facer layer may be included on the insulation component 106 on the opposite face from the first facing layer, such as facing layers 206a and 206c in FIG. 2. The first and second facing layers may be made the same or different materials. In other words, the material of the first and second facing layers may be independently selected from a composite multi-layer foil, glass based material that includes glass fleece, polymer membrane based material, and wood-based material. Each facing layer may independently have a thickness from 0.01 mm to 3 mm (e.g., 0.05 to 0.6 mm, 0.05 to 0.1 mm, 0.07 to 0.09 mm, etc.). According to one particular embodiment, the first facing layer may be made of the same material and have the same thickness as the second facing layer.

In various embodiments, at least one of the closed cell polyurethane/polyisocyanurate foam layer 202 and the open cell polyurethane/polyisocyanurate foam layer 204 may be formed on the facing layer. For example, the closed cell polyurethane/polyisocyanurate foam layer 202 or the open cell polyurethane/polyisocyanurate foam layer 204 may be formed on a surface of the facing layer by application of a liquid reaction mixture to the facing. Additionally or alternatively, one or more of the closed cell polyurethane/polyisocyanurate foam layer 202 and the open cell polyurethane/polyisocyanurate foam layer 204 may be applied to a facing layer in solid form, such as by securing the layer to the facing layer with an adhesive.

In one particular embodiment, the open cell polyurethane/polyisocyanurate foam layer may be formed on a facing layer by applying a liquid reaction mixture to the facing layer. After a delay to allow the open cell polyurethane/polyisocyanurate foam layer to at least partially gel, the liquid reaction mixture for the closed cell polyurethane/polyisocyanurate foam layer may be applied to the open cell polyurethane/polyisocyanurate foam layer. In some embodiments, the delay may be 10 seconds or more. In another particular embodiment, a first reaction mixture for forming the closed-celled polyurethane/polyisocyanurate layer may be dispensed over a first facing. A second facing is then fed and the first facing and the second facing with the reacting mixture there between is allowed to pass through two rotating rolls. Then, a second reaction mixture for forming the open-celled polyurethane/polyisocyanurate layers is dispensed over the outer face of the second facing. A third facing is then laid down as the uppermost layer and the forming panel is allowed to cure travelling through a two spaced apart opposed forming conveyors. Alternatively, an additional facing layer may be applied to the closed cell polyurethane/polyisocyanurate foam layer as the polyurethane foam is formed. Alternatively, the closed cell polyurethane/polyisocyanurate foam layer may be formed on a second facing layer and the open cell polyurethane/polyisocyanurate foam layer and the closed cell polyurethane/polyisocyanurate foam layer may be secured to one another using an adhesive. Other methods of manufacturing the insulation layer 106 may be used. In some particular embodiments, one or more of the outermost facing layers may be removed before use.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

STEPANPOL™ PS 2352 is a polyester polyol available from Stepan;

STEPANPOL™ PS 3152 is a polyester polyol available from Stepan;

VORANOL™ CP 1055 is a polyether polyol available from The Dow Chemical Company (Midland, Mich.);

TERCAROL™ 5903 is a polyether polyol available from The Dow Chemical Company (Midland, Mich.);

VORANOL™ CP 260 is a polyether polyol available from The Dow Chemical Company (Midland, Mich.);

TCPP is trichloroisopropyl phosphate;

NIAX™ L-6633 is a silicone surfactant available from Momentive Performance Materials, Inc. (Waterford, N.Y.);

NIAX™ L-6164 is an additive available from Momentive Performance Materials, Inc. (Waterford, N.Y.);

POLYCAT™ 5 is a pentamethyl diethylene triamine catalyst available from Evonik Industries;

POLYCAT™ 8 is a tertiary amine catalyst available from Evonik Industries;

DABCO™ K 2097, DABCO™ K 15 and POLYCAT™ 41 are trimerization catalysts available from Evonik Industries;

c/i-pentane 70/30 is a commercially available blend consisting of 70 wt % cyclopentane and 30 wt % of isopentane;

VORANATE™ M 600 is a polymeric methylene diphenyl di-isocyanate (PMDI) available from The Dow Chemical Company (Midland, Mich.); and VORANATE™ M 220 is a polymeric methylene diphenyl di-isocyanate (PMDI) available from The Dow Chemical Company (Midland, Mich.).

Foam samples were prepared using high pressure dosing-dispensing machines from Afros-Cannon. The isocyanate-reactive component and blowing agent were premixed. The isocyanate-reactive component, blowing agent, and isocyanate were processed at 20±2° C. using a mix pressure of 15,000±2,000 kPa. Open cell content of each foam sample was measured according to ASTM D 6226.

Properties of Comparative Examples A-D are reported together with Examples 1 and 2 in Table 1. Comparative Example A is a closed cell polyurethane/polyisocyanurate foam layer. Comparative Examples B and C are open cell polyurethane/polyisocyanurate foam layers. Comparative Example D is a layer of commercially available white EPS (e.g. PORON 035 from Gruppo Poron). Example 1 is a layer of the closed cell polyurethane/polyisocyanurate foam layer of Comparative Example A positioned between two layers of the open cell polyurethane/polyisocyanurate foam layer of Comparative Example B. Example 2 is a layer of the closed cell polyurethane/polyisocyanurate foam layer of Comparative Example A positioned between two layers of the open cell polyurethane/polyisocyanurate foam layer of Comparative Example C. In particular, in Examples 1 and 2, the closed cell polyurethane/polyisocyanurate foam layer was glued to each of the open cell polyurethane/polyisocyanurate foam layer.

The open cell layers of Comparative Examples B and C were prepared according to the "open cell" formulation in Table 1. Comparative Example B was taken from a free-rise foam bun, while Comparative Example C was prepared applying a certain over-packing in a closed mold. The closed cell foam of Comparative Example A was prepared according to the "closed cell" formulation in Table 1, produced in a continuous lamination process.

TABLE 1

|  | Closed Cell | Open Cell |
| --- | --- | --- |
| STEPANPOL ™ PS 2352 | 48.5 | — |
| STEPANPOL ™ PS 3152 | 48.5 | — |
| VORANOL ™ CP 1055 | — | 46.4 |
| TERCAROL ™ 5903 | — | 9.3 |
| VORANOL ™ CP 260 | — | 37.3 |
| TCPP | 8.6 | — |
| NIAX ™ L-6633 Silicone | 2.2 | — |
| NIAX ™ L-6164 | — | 2.0 |
| DABCO ™ K 2097 | 0.5 | — |
| POLYCAT ™ 5 | 0.3 | 0.5 |
| POLYCAT ™ 8 | — | 2.0 |
| POLYCAT ™ 41 | — | 0.5 |
| Water | 0.5 | 4.0 |
| DABCO ™ K 15 | 3.8 | — |
| DABCO ™ K 2097 | 0.5 | — |
| c/i-pentane 70/30 | 15 | — |
| Isocyanate | | |
| VORANATE ™ M 600 | 193 | — |
| VORANATE ™ M 220 | — | 138 |
| Index | 2.5 | — |

Dimensional changes of an 80 mm×80 mm×80 mm specimen after a 4-day thermal cycle (2 days at 70° C., 90% RH and 2 days at 70° C., 25% RH) of Examples 1 and 2 and Comparative Example A were measured and are reported in Table 2.

TABLE 2

| Foam Properties | Comp. Ex. A | Comp. Ex. B | Comp. Ex. C | Comp. Ex. D | Example 1 | Example 2 |
| --- | --- | --- | --- | --- | --- | --- |
| Applied rise density (kg/m³) | 32.2 | 29.6 | 65 | 15* | — | — |
| Open cell (% volume) | 8 | 95 | 80 | — | — | — |
| Open cell layer thickness (each) (cm) | 0 | — | — | — | 1 | 1 |
| Closed cell layer thickness (cm) | 8 | — | — | — | 6 | 6 |

TABLE 2-continued

| Foam Properties | Comp. Ex. A | Comp. Ex. B | Comp. Ex. C | Comp. Ex. D | Example 1 | Example 2 |
|---|---|---|---|---|---|---|
| k-factor (mW/m*K) at 10° C. | 19.5 | N/A | 32.8 | >30 | N/A | 21.7** |
| Thermal resistance (R-value) at 10° C. (m²K/W) | 4.10 | N/A | 2.40 | <2.67 | N/A | 3.69 |
| Dimensional stability width direction (%) | 5.1 ± 0.2 | N/A | N/A | 0.2 ± 0.2 | −0.1 ± 0.4 | −0.4 ± 0.04 |

As shown in Table 2, the dimensional changes for Examples 1 and 2 are closer to 0 than for Comparative Example A, indicating that the open cell layers can provide improved dimensional stability for closed cell foams when used in combination.

The thermal insulation of the Comparative Example A and C was measured by means of a LaserComp heat flow meter instrument at 10° C. The specimen dimensions were 200 mm×200 mm×50 mm (thickness). The thermal resistance (R-value) of Example 2 was then calculated from the thermal conductivity values of the different layers. The R-value of Example 2, while slightly lower than the Comparative Example A, was by far better than conventional insulation products used for ETICS applications such as EPS, gray EPS or mineral wool whose R values for same thickness are lower than 2.67 m²K/W.

Various embodiments described demonstrate that the multilayered panel, while showing a certain worsening of thermal resistance compared with a board consisting exclusively of closed celled foam (Comparative Example A) provides much better thermal insulation when compared with common materials presently used for ETICS applications (Comparative Example D). Accordingly, various embodiments described herein may be employed in thermal insulation composite applications where improved dimensional stability is desired.

It is further noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. An external thermal insulation composite system, comprising:
a concrete or masonry external wall; and
a multilayer thermal insulation board disposed on an external surface of the concrete or masonry external wall, the multilayer thermal insulation board, comprising:
at least one rigid or semi-rigid closed cell polyurethane foam layer having an open cell volume of less than 20% by volume according to ASTM D 6226, the at least one closed cell polyurethane foam layer having opposing major surfaces defining a thickness therebetween,
at least one rigid or semi-rigid open cell polyurethane foam layer having an open cell volume of greater than 80% by volume according to ASTM D 6226, the at least one open cell polyurethane foam layer being disposed on one or both major surfaces of the at least one closed cell polyurethane layer and having a thickness or a combined thickness, respectively, less than the thickness of the closed cell polyurethane foam layer,
wherein the multilayer thermal insulation board having a total layer thickness exhibits improved dimensional stability in comparison to a closed cell polyurethane foam board having an identical thickness, length, and width, wherein improved dimensional stability is measured as a dimensional change percentage in the width direction after a 4-day thermal cycle closer to zero than that of the closed cell polyurethane foam board.

2. The external thermal insulation composite system of claim 1, wherein the at least one closed cell foam layer has a thermal conductivity value (k-factor) of less than 24 mW/m*K measured at 10° C.

3. The external thermal insulation composite system of claim 1, wherein the at least one closed cell foam layer has a density below 50 kg/m³ according to ASTM D 1622 and wherein the at least one open cell foam layer has a density from 30 kg/m³ to 80 kg/m³ according to ASTM D 1622.

4. The external thermal insulation composite system of claim 1, wherein the at least one closed cell foam layer has a density below 40 kg/m³ according to ASTM D 1622 and a thermal conductivity value (k-factor) of less than 22 mW/m*K measured at 10° C. and wherein the at least one open cell foam layer has a density from 30 kg/m³ to 70 kg/m³ according to ASTM D 1622.

5. The external thermal insulation composite system of claim 1, wherein the polyurethane foam of the at least one closed cell polyurethane foam layer and the at least one open cell polyurethane foam layer comprises a polyurethane/polyisocyanurate foam system comprising an isocyanate-reactive component and an isocyanate component.

6. The external thermal insulation composite system of claim 5, wherein the open cell volume of the at least one open cell polyurethane foam layer is controlled by a cell-opening surfactant, wherein the cell-opening surfactant comprises 0.5 wt % to 15 wt % based on a total weight of the isocyanate-reactive component.

7. The external thermal insulation composite system of claim 1, wherein the multilayer thermal insulation board further comprises at least one facing layer positioned at one or both major surfaces of the at least one closed cell polyurethane foam layer, which may be located between a closed cell polyurethane foam layer and an open cell polyurethane foam layer, and/or positioned at a major surface of the at least one open cell polyurethane foam layer.

8. The external thermal insulation composite system of claim 7, wherein the at least one facing layer comprises a non-metal based facing layer comprising a saturated or non-saturated glass-based fleece material, polymer membrane based material, or composite multilayer foil material.

9. The external thermal insulation composite system of claim 1, further comprising a reinforced coating comprising a glass fiber mesh positioned on an external surface of the multilayer board.

10. The external thermal insulation composite system of claim 9, further comprising a decorative topcoat positioned on an external surface of the reinforced coating.

11. The external thermal insulation composite system of claim 1, wherein the multilayer thermal insulation board is disposed on the external surface of the concrete or masonry external wall via adhesive attachment.

12. A method of preparing the external thermal insulation system of claim 1, comprising:
providing the concrete or masonry external wall;
providing the multilayer thermal insulation board,
attaching the multilayer thermal insulation board to the external surface of the concrete or masonry external wall; and
applying a reinforced coating comprising glass fiber mesh on an external surface of the attached multilayer thermal insulation board.

13. The method of claim 12, wherein the multilayer thermal insulation board is prepared according to a continuous process, comprising:
providing a first facing as a lowermost layer;
dispensing a first reaction mixture to form the at least one closed cell foam layer on a surface of the first facing;
optionally, providing a second facing on the at least one closed cell foam layer;
optionally, passing the first facing, optional second facing, and the at least one closed cell foam layer, optionally therebetween, through two rotating rolls;
dispensing a second reaction mixture to form the at least one open cell foam layer on the at least one closed cell foam or on the second facing, if present;
providing a third facing layer on the at least one open cell foam layer as an uppermost layer; and
allowing the first and second reaction mixtures to cure between two spaced apart, opposed forming conveyors forming the multilayer thermal insulation board.

14. The method of claim 12, wherein the multilayer thermal insulation board is prepared according to a continuous process, comprising:
providing a first facing as a lowermost layer;
dispensing a first reaction mixture to form the at least one open cell foam layer on a surface of the first facing;
optionally, providing a second facing on the at least one open cell foam layer;
optionally, passing the first facing, optional second facing, and the at least one open cell foam layer, optionally therebetween, through two rotating rolls;
dispensing a second reaction mixture to form the at least one closed cell foam layer on the at least one open cell foam layer or on the second facing, if present;
providing a third facing layer on the at least one closed cell foam layer as an uppermost layer; and
allowing the first and second reaction mixtures to cure between two spaced apart, opposed forming conveyors forming the multilayer thermal insulation board.

15. The method of claim 13 or 14, wherein at least one of the first facing and the third facing is a peel-able facing layer that is removed before the multilayer thermal insulation board is attached to the external surface of the concrete or masonry external wall.

16. A multilayer thermal insulation board, comprising:
at least one rigid or semi-rigid closed cell polyurethane foam layer having an open cell volume of less than 20% by volume according to ASTM D 6226, the at least one closed cell polyurethane foam layer having opposing major surfaces defining a thickness therebetween and a thermal conductivity value (k-factor) of less than 24 mW/m*K measured at 10° C.; and
at least one rigid or semi-rigid open cell polyurethane foam layer having an open cell volume of greater than 80% by volume according to ASTM D 6226, the at least one open cell polyurethane foam layer being disposed on one or both major surfaces of the at least one closed cell polyurethane layer and having a thickness or a combined thickness, respectively, less than the thickness of the closed cell polyurethane foam layer,
wherein the multilayer thermal insulation board having a total layer thickness exhibits improved dimensional stability in comparison to a closed cell polyurethane foam board having an identical thickness, length, and width, wherein improved dimensional stability is measured as a dimensional change percentage in the width direction after a 4-day thermal cycle closer to zero than that of the closed cell polyurethane foam board.

17. The multilayer thermal insulation board of claim 16, wherein the at least one closed cell foam layer has a density below 50 kg/m³ according to ASTM D 1622 and wherein the at least one open cell foam layer has a density from 30 kg/m³ to 80 kg/m³ according to ASTM D 1622.

18. The multilayer thermal insulation board of claim 16, wherein the polyurethane foam of the at least one closed cell polyurethane foam layer and the at least one open cell polyurethane foam layer comprises a polyurethane/polyisocyanurate foam system comprising an isocyanate-reactive component and an isocyanate component.

19. The multilayer thermal insulation board of claim 16, further comprising at least one facing layer positioned at one or both major surfaces of the at least one closed cell polyurethane foam layer, which may be located between a closed cell polyurethane foam layer and an open cell polyurethane foam layer, and/or positioned at a major surface of the at least one open cell polyurethane foam layer.

20. The multilayer thermal insulation board of claim 19, wherein the at least one facing layer comprises a non-metal based facing layer comprising a saturated or non-saturated glass-based fleece material, polymer membrane based material, or composite multilayer foil material.

* * * * *